(12) United States Patent
Chae et al.

(10) Patent No.: US 10,668,797 B2
(45) Date of Patent: Jun. 2, 2020

(54) POWER TRANSMISSION APPARATUS FOR A VEHICLE

(71) Applicants: Hyundai Motor Company, Seoul (KR); KIA Motors Corporation, Seoul (KR)

(72) Inventors: Minho Chae, Incheon (KR); Woochurl Son, Gyeonggi-do (KR); Sun Sung Kwon, Gyeonggi-do (KR); Seong Wook Hwang, Gyeonggi-do (KR); Kijong Park, Gyeonggi-do (KR); Yong Uk Shin, Gyeonggi-do (KR); Seongwook Ji, Gyeonggi-do (KR); Ki Tae Kim, Incheon (KR); Chon Ok Kim, Gyeonggi-do (KR); Wonmin Cho, Gyeonggi-do (KR); Hyun Sik Kwon, Seoul (KR); Ilhan Yoo, Jeollanam-do (KR); Juhyeon Park, Gyeonggi-do (KR); Cheol Ho Jang, Busan (KR); Dongwoo Kim, Incheon (KR); Hye Jin Lim, Seoul (KR); Soonki Eo, Gyeonggi-do (KR); Ki Dong Kim, Gyeonggi-do (KR); Woo Jin Chang, Gyeonggi-do (KR); Yong Sug Choi, Gyeonggi-do (KR); Young Chan Gweon, Seoul (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 12 days.

(21) Appl. No.: 16/213,036

(22) Filed: Dec. 7, 2018

(65) Prior Publication Data
US 2020/0047602 A1 Feb. 13, 2020

(30) Foreign Application Priority Data
Aug. 10, 2018 (KR) .......................... 10-2018-0093572

(51) Int. Cl.
*B60K 6/365* (2007.10)
*F16H 3/093* (2006.01)
(Continued)

(52) U.S. Cl.
CPC ............... *B60K 6/365* (2013.01); *B60K 6/48* (2013.01); *B60K 6/547* (2013.01); *F16H 3/006* (2013.01);
(Continued)

(58) Field of Classification Search
CPC ...... F16H 2200/0021; F16H 2200/0065; F16H 2200/2005; F16H 3/093; F16H 3/54;
(Continued)

(56) References Cited

U.S. PATENT DOCUMENTS 8,323,142 B2 12/2012 Masumoto
9,920,824 B1* 3/2018 Hwang ................. F16H 37/042
(Continued)

FOREIGN PATENT DOCUMENTS

EP 3121483 A1 1/2017

*Primary Examiner* — David R Morris
*Assistant Examiner* — Lillian T Nguyen
(74) *Attorney, Agent, or Firm* — Brinks Gilson & Lione (57) ABSTRACT

A power transmission apparatus for a vehicle may include a first input shaft directly connected with a motor/generator, second and third input shafts and torque mediating shaft coaxial and selectively connected with the first input shaft, a first intermediate shaft and first and second idle shafts in parallel with the first input shaft, a second intermediate shaft in parallel with the first input shaft, and selectively connected with a transmission housing, an output shaft in parallel with the first input shaft, and coaxial and selectively connected with the second intermediate shaft, a first shifting section including six gear sets, selectively receiving torque through the first and third input shafts, and outputting intermediate shift-stages, and a second shifting section
(Continued)

including a planetary gear set, forming an output torque by combination torques from the first shifting section and the second input shaft, and outputting the output torque to the output shaft.

9 Claims, 2 Drawing Sheets

(51) Int. Cl.
| | | |
|---|---|---|
| | *F16H 3/72* | (2006.01) |
| | *B60K 6/48* | (2007.10) |
| | *F16H 3/00* | (2006.01) |
| | *B60K 6/547* | (2007.10) |
| | *F16H 3/08* | (2006.01) |

(52) U.S. Cl.
CPC ............. *F16H 3/093* (2013.01); *F16H 3/725* (2013.01); *B60K 2006/4825* (2013.01); *B60Y 2200/92* (2013.01); *F16H 2003/0803* (2013.01); *F16H 2200/0021* (2013.01); *F16H 2200/0065* (2013.01); *F16H 2200/2005* (2013.01); *F16H 2200/2033* (2013.01)

(58) Field of Classification Search
CPC .. F16H 37/065; F16H 2200/2041–2200/2046; F16H 3/006–2003/008; B60K 6/365; B60K 2006/4825; B60K 6/48; B60K 6/547; B60Y 2200/92
See application file for complete search history.

(56) References Cited

U.S. PATENT DOCUMENTS

| | | | |
|---|---|---|---|
| 10,549,623 B1* | 2/2020 | Park | B60K 6/36 |
| 2013/0031990 A1 | 2/2013 | Singh et al. | |
| 2013/0337972 A1* | 12/2013 | Lee | B60W 20/40 |
| | | | 477/5 |
| 2015/0105204 A1* | 4/2015 | Kim | B60K 6/547 |
| | | | 475/5 |
| 2018/0111471 A1* | 4/2018 | Lee | B60K 6/48 |
| 2018/0154757 A1* | 6/2018 | Lee | B60K 6/365 |
| 2019/0120342 A1* | 4/2019 | Hwang | F16H 3/78 |

* cited by examiner

| Mode | Shift-stage | ECL | CL1 | CL2 | CL3 | CL4 | B1 | SN1 | | | SN2 | | |
|---|---|---|---|---|---|---|---|---|---|---|---|---|---|
| | | | | | | | | IDG2 | N | IDG3 | IDG4 | N | IDG5 |
| engine and Parallel mode | REV | ● | | | ● | ● | | ○ | ● | ○ | | | ● |
| | FD1 | ● | ● | | | ● | | ● | | | ○ | ● | ○ |
| | FD2 | ● | | | ● | ● | | ○ | ● | ○ | ● | | |
| | FD3 | ● | ● | | | ● | | | ● | | ○ | ● | ○ |
| | FD4 | ● | | ● | | ● | | ○ | ● | ○ | ○ | ● | ○ |
| | FD5 | ● | ● | ● | | | | | ● | | ○ | ● | ○ |
| | FD6 | ● | | ● | ● | | | ○ | ● | ○ | ● | | |
| | FD7 | ● | ● | ● | | | | ● | | | ○ | ● | ○ |
| | FD8 | ● | | ● | | | ● | ○ | ● | ○ | ○ | ● | ○ |
| | FD9 | ● | | ● | ● | | | ○ | ● | ○ | | | ● |
| EV mode | REV | | | | ● | ● | | ○ | ● | ○ | | | ● |
| | FD1 | | ● | | | ● | | ● | | | ○ | ● | ○ |
| | FD2 | | | | ● | ● | | ○ | ● | ○ | ● | | |
| | FD3 | | ● | | | ● | | | ● | | ○ | ● | ○ |
| | FD4 | | | ● | | ● | | ○ | ● | ○ | ○ | ● | ○ |
| | FD5 | | ● | ● | | | | | ● | | ○ | ● | ○ |
| | FD6 | | | ● | ● | | | ○ | ● | ○ | ● | | |
| | FD7 | | ● | ● | | | | ● | | | ○ | ● | ○ |
| | FD8 | | | ● | | | ● | ○ | ● | ○ | ○ | ● | ○ |
| | FD9 | | | ● | ● | | | ○ | ● | ○ | | | ● |

○ : Preliminary engagement available

POWER TRANSMISSION APPARATUS FOR A VEHICLE

CROSS-REFERENCE TO RELATED APPLICATION

This application claims priority to and the benefit of Korean Patent Application No. 10-2018-0093572 filed on Aug. 10, 2018, the entire contents of which are incorporated herein by reference.

FIELD

The present disclosure relates to a power transmission apparatus for a vehicle.

BACKGROUND

The statements in this section merely provide background information related to the present disclosure and may not constitute prior art.

There has been recent emphasis on environmentally-friendly technologies for vehicles, and advanced car makers have begun to develop environmentally-friendly vehicles to achieve environmental and fuel efficiency regulations.

An electric vehicle (EV) or a hybrid electric vehicle (HEV) that utilizes electrical energy, or a double clutch transmission (DCT) improving efficiency and convenience of a transmission may be examples of such vehicle technology.

The double clutch transmission (DCT) includes two clutches devices and a gear train of a basically manual transmission, selectively transmits a torque input from an engine to two input shafts by using the two clutches devices, and outputs a torque shifted by the gear train.

Such a double clutch transmission (DCT) attempts to compactly realize a multi-stage transmission of more than five speeds. The DCT achieves an automated manual transmission (AMT) that removes the inconvenience of a manual shifting of a driver, by controlling two clutches and synchronizing devices by a controller.

We have discovered that, in comparison with an automatic transmission using planetary gears, such a DCT shows merits, such as higher efficiency in power delivery, easier modification in revising or adding parts in order to achieve more shift-stages, etc., and can more comfortably conform to fuel consumption regulation and efficiency in achieving more shift-stages.

The above information is only for enhancement of understanding of the background of the disclosure and therefore it may contain information that does not form the prior art that is already known to a person of ordinary skill in the art.

SUMMARY

Described herein is a power transmission apparatus for a vehicle which can achieve shift-stages in an electric vehicle mode and in a parallel hybrid mode by employing a planetary gear set and two synchronizers to a double clutch scheme, thereby improving fuel consumption and better applicability to a hybrid vehicle.

In one aspect, a power transmission apparatus is for a vehicle having an engine output shaft and a motor/generator having a motor shaft selectively connected to the engine output shaft. The power transmission apparatus may includes a first input shaft, a second input shaft, a third input shaft, a torque mediating shaft, a first intermediate shaft, a second intermediate shaft, first and second idle shafts, an output shaft, a first shifting section, and a second shifting section. The first input shaft may be directly connected with the motor/generator. The second input shaft may be formed as a hollow shaft, disposed coaxial with and external to the first input shaft without rotational interference, and selectively connected with the first input shaft. The third input shaft may be formed as a hollow shaft, disposed coaxial with and external to the second input shaft without rotational interference, and selectively connected with the first input shaft. The torque mediating shaft may be formed as a hollow shaft disposed coaxial with and external to the first input shaft without rotational interference, and selectively connected with the first input shaft. The first intermediate shaft may be disposed in parallel with the first input shaft. The second intermediate shaft may be disposed in parallel with the first input shaft, and selectively connected with a transmission housing. The first and second idle shafts may be disposed in parallel with the first input shaft. The output shaft may be disposed in parallel with the first input shaft and coaxially with the second intermediate shaft, and selectively connected with the second intermediate shaft. The first shifting section may include six gear sets disposed on the first and third input shafts, the first and second intermediate shafts, the first and second idle shafts, and the torque mediating shaft The first shifting section may selectively receive torque through the first and third input shafts and output a plurality of intermediate shift-stages shifted from the received torque. The second shifting section may include a planetary gear set having a sun gear fixedly connected with the output shaft, form an output torque by combination a torque selectively transmitted from the first shifting section through the six gear sets and a torque received from the second input shaft, and output the output torque to the output shaft.

The first shifting section may include first, second, third, fourth, fifth, and sixth gear sets. The first gear set may include a first drive gear fixedly connected with the third input shaft, an idle gear fixedly connected with the first idle shaft and externally gear-meshed with the first drive gear, and a first driven gear fixedly connected with the first intermediate shaft and externally gear-meshed with the idle gear. The second gear set may include a second drive gear disposed coaxial with and external to the first intermediate shaft without rotational interference, and a second driven gear fixedly connected with the ring gear of the planetary gear set and externally gear-meshed with the second drive gear. The third gear set may include a third drive gear disposed coaxial with and external to the first intermediate shaft without rotational interference, and a third driven gear fixedly connected with the second intermediate shaft and externally gear-meshed with the third drive gear. The fourth gear set may include a fourth drive gear disposed coaxial with and external to the torque mediating shaft without rotational interference, and a second driven gear externally gear-meshed with the fourth drive gear. The fifth gear set may include a fifth drive gear disposed coaxial with and external to the torque mediating shaft without rotational interference, and a fifth driven gear fixedly connected with the second idle shaft and externally gear-meshed with the fifth drive gear. The sixth gear set may include a sixth drive gear fixedly connected with the second idle shaft, and a second driven gear externally gear-meshed with the sixth drive gear.

The second drive gear and the third drive gear may be selectively connected with the first intermediate shaft through the first synchronizer. The fourth drive gear and the fifth drive gear may be selectively connected with the torque mediating shaft through the second synchronizer.

Gear ratios of the first gear set and the second gear set may be used for realizing the forward first speed and the forward seventh speed. Gear ratios of the first gear set and the third gear set may be used for realizing the forward third speed and the forward fifth speed. A gear ratio of the fourth gear set may be used for realizing the forward second speed and the forward sixth speed. Gear ratios of the fifth gear set and the sixth gear set may be used for realizing the forward ninth speed and the reverse speed. A gear ratio of the seventh gear set may be used for realizing the forward fourth speed.

The ring gear of the planetary gear set may receive a torque from the first shifting section. The planet carrier of the planetary gear set may receive a torque from the second input shaft through the seventh gear set. The sun gear may be fixedly connected with the output shaft and selectively connected with the ring gear.

The seventh gear set may include a seventh drive gear fixedly connected with the second input shaft, and a seventh driven gear fixedly connected with the planet carrier of the planetary gear set and externally gear-meshed with the seventh drive gear.

The planetary gear set may be a single pinion planetary gear set.

The power transmission apparatus may further include five clutches each selectively connecting a corresponding pair among the shafts, and a brake selectively connecting a corresponding shaft to the transmission housing.

The five clutches may include an engine clutch arranged between the engine output shaft and the first input shaft, a first clutch arranged between the first input shaft and the third input shaft, a second clutch arranged between the first input shaft and the second input shaft, a third clutch arranged between the first input shaft and the torque mediating shaft, and a fourth clutch disposed between the ring gear and sun gear of the planetary gear set. The brake may be arranged between the second intermediate shaft and the transmission housing.

A power transmission apparatus for a vehicle realizes shift-stages of nine forward speeds and one reverse speed by employing a planetary gear set and two synchronizers to a multiple clutch transmission, thereby enabling multiple shift-stages by a simplified arrangement, improving installability, and reducing an overall weight.

In addition, an aspect of the present disclosure may receive torque from a motor/generator as well as an engine, such that a vehicle may be driving in an electric vehicle mode and parallel hybrid mode, thereby improving fuel consumption.

Further, effects that can be obtained or expected from aspects of the present disclosure are directly or suggestively described in the following detailed description. That is, various effects expected from aspects of the present disclosure are described in the following detailed description.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features. As those skilled in the art will realize, the contents may be modified in various different ways, all without departing from the spirit or scope of the present disclosure.

In the following description, dividing names of components into first, second and the like is to divide the names because the names of the components are similar to or the same as each other, and an order thereof is not particularly limited.

Figure 1:
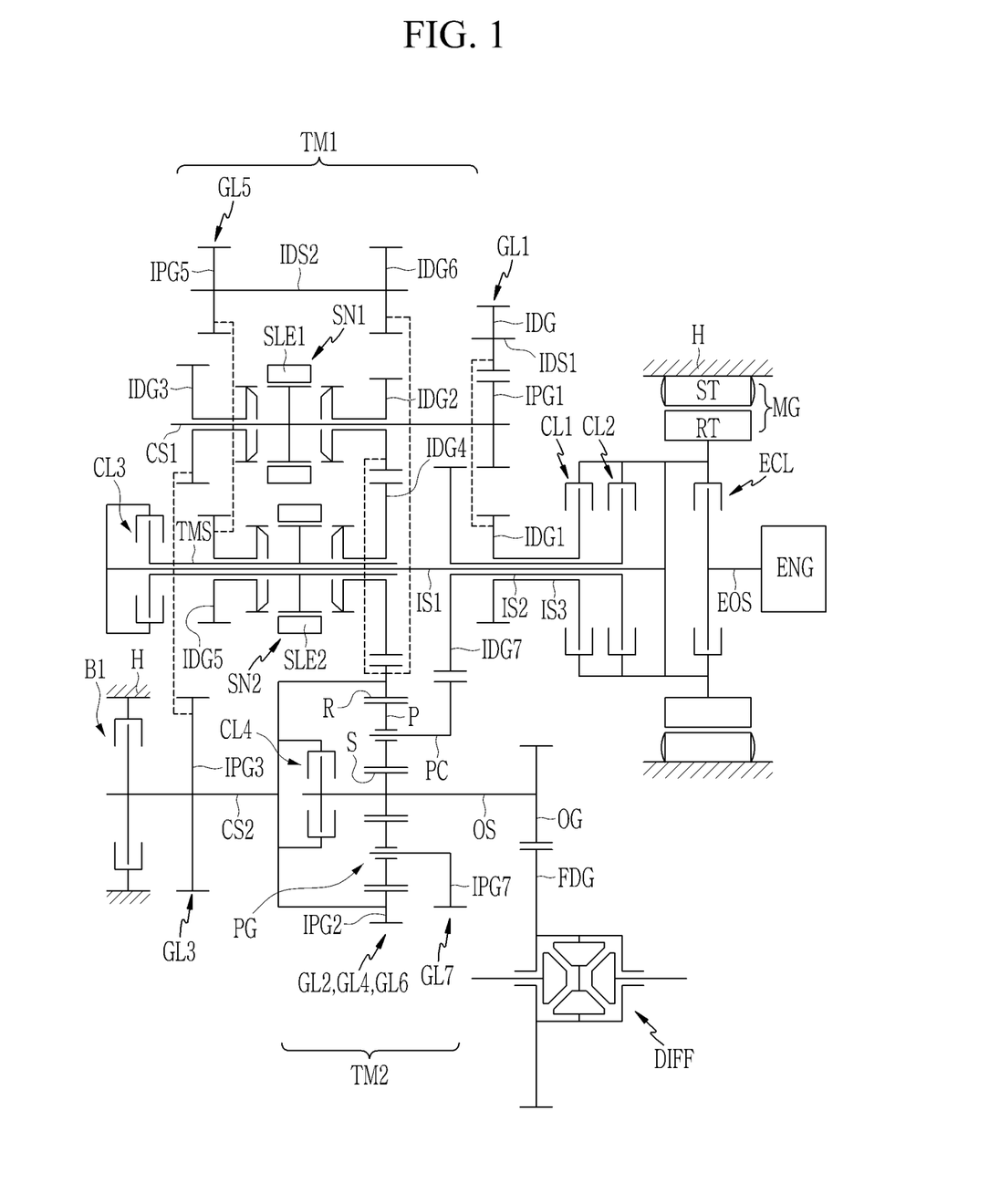
FIG. 1 is a schematic view of a power transmission apparatus for a vehicle.

FIG. 1 is a schematic view of a power transmission apparatus for a vehicle.

Referring to FIG. 1, a power transmission apparatus shifts torques of an engine ENG as a primary power source and a motor/generator MG as an auxiliary power source, and includes first, second, and third input shafts IS1, IS2, and IS3, torque mediating shaft TMS, first and second intermediate shafts CS1 and CS2, first and second idle shafts IDS1 and IDS2, first and second shifting sections TM1 and TM2, and an output shaft OS.

The engine ENG is a primary power source and a variety of typical engines such as a gasoline engine or a diesel engine that uses fossil fuel may be used as the engine ENG.

The motor/generator MG as an auxiliary power source may act as a motor and also as a generator, and includes a stator ST and a rotor RT, where the stator ST is fixed to the transmission housing H and the rotor RT is rotatably supported within the stator ST.

Torques from the engine ENG and/or the motor/generator MG are supplied to the first shifting section TM1, and a plurality of intermediate shift-stages are formed at the first shifting section TM1 by the supplied torques. Receiving a torque from the first shifting section TM1 and selectively receiving a reverse torque from the engine ENG through the second input shaft IS2, the second shifting section TM2 performs shifting operation and outputs a shifted torque through the output shaft OS.

The first, second, and third input shafts IS1, IS2, and IS3 and the torque mediating shaft TMS are disposed on a same axis. The first and second intermediate shafts CS1 and CS2, the output shaft OS, and the first and second idle shafts IDS1 and IDS2 are disposed in parallel with the first input shaft IS1. The second intermediate shaft CS2 and the output shaft OS are disposed on a same axis and selectively interconnected with each other.

The motor/generator MG is disposed to be rear of the engine ENG. The rotor RT of the motor/generator MG is selectively connected with an output shaft EOS of the engine ENG interposing an engine clutch ECL.

The first input shaft IS1 is fixedly connected with the rotor RT of the motor/generator MG. The first input shaft IS1 delivers torques from the engine ENG and the motor/generator MG to the first shifting section TM1.

The second input shaft IS2 is formed as a hollow shaft and disposed coaxial with and external to the first input shaft IS1 without rotational interference, and selectively connected with the first input shaft IS1 thereby selectively transmitting torques of the engine ENG and the motor/generator MG to the second shifting section TM2.

The third input shaft IS3 is formed as a hollow shaft and disposed coaxial with and external to the second input shaft IS2 without rotational interference, and selectively connected with the first input shaft IS1 thereby transmitting the torques of the engine ENG and the motor/generator MG to the first shifting section TM1.

The torque mediating shaft TMS is formed as a hollow shaft and disposed coaxial with and external to the first input shaft IS1, and selectively connected with the first input shaft IS1.

The second intermediate shaft CS2 is selectively connected with the transmission housing H through a first brake B1, and may be selectively fixed in a rotating direction.

The first shifting section TM1 includes the first and third input shafts IS1 and IS3, the first and second intermediate shafts CS1 and CS2, the torque mediating shaft TMS, first, second, third, fourth, fifth, and sixth gear sets GL1, GL2, GL3, GL4, GL5, and GL6 disposed on first and second idle shafts IDS1 and IDS2.

The second shifting section TM2 includes a planetary gear set PG. The planetary gear set PG is a single pinion planetary gear set, and includes a sun gear S, a planet carrier PC rotatably supporting a plurality of pinion gears P externally gear-meshed with the sun gear S, and a ring gear R internally gear-meshed with the plurality of pinion gears P.

The planetary gear set PG is disposed on the output shaft OS. The sun gear S is fixedly connected with the output shaft OS. The planet carrier PC is fixedly connected with the second input shaft IS2 through the seventh gear set GL7. The ring gear R is fixedly connected with the second gear set GL2.

The planetary gear set PG may integrally rotate by selectively interconnecting two rotation elements among three rotation elements. According to one aspect of the present disclosure, the ring gear R is selectively connected with the sun gear S fixedly connected to the output shaft OS.

As a result, by the planetary gear set PG of the second shifting section TM2, torques input through the ring gear R and the planet carrier PC may be output as inputted, or such torques may be combined to form a shifted output torque when the input torques have different rotation speeds.

The first, second, third, fourth, fifth, sixth, and seventh input gear sets GL1, GL2, GL3, GL4, GL5, GL6, and GL7 are arranged as follows.

The first gear set GL1 includes a first drive gear IDG1 fixedly connected with the third input shaft IS3, an idle gear IDG fixedly connected with the first idle shaft IDS1 and externally gear-meshed with the first drive gear IDG1, and a first driven gear IPG1 fixedly connected with the first intermediate shaft CS1 and externally gear-meshed with the idle gear IDG.

The second gear set GL2 includes a second drive gear IDG2 rotatably disposed on an external circumference of the first intermediate shaft CS1 without rotational interference, and a second driven gear IPG2 fixedly connected with the ring gear R of the planetary gear set PG and externally gear-meshed with the second drive gear IDG2.

The third gear set GL3 includes a third drive gear IDG3 rotatably disposed on an external circumference of the first intermediate shaft CS1 without rotational interference, and a third driven gear IPG3 fixedly connected with the second intermediate shaft CS2 and externally gear-meshed with the third drive gear IDG3.

The fourth gear set GL4 includes a fourth drive gear IDG4 rotatably disposed on an external circumference of the torque mediating shaft TMS without rotational interference, and a second driven gear IPG2 fixedly connected with the ring gear R of the planetary gear set PG and externally gear-meshed with the fourth drive gear IDG4.

The fifth gear set GL5 includes a fifth drive gear IDG5 rotatably disposed on an external circumference of the torque mediating shaft TMS without rotational interference, and a fifth driven gear IPG5 fixedly connected with the second idle shaft IDS2 and externally gear-meshed with the fifth drive gear IDG5.

The sixth gear set GL6 includes a sixth drive gear IDG6 fixedly connected with the second idle shaft IDS2, and a second driven gear IPG2 fixedly connected with the ring gear R of the planetary gear set PG and externally gear-meshed with the sixth drive gear IDG6.

The seventh gear set GL7 includes a seventh drive gear IDG7 fixedly connected with the second input shaft IS2, and a seventh driven gear IPG7 fixedly connected with the planet carrier PC of the planetary gear set PG and externally gear-meshed with the seventh drive gear IDG7.

The second drive gear IDG2 and the third drive gear IDG3 selectively connected to the first intermediate shaft CS1 by a first synchronizer SN1.

The fourth drive gear IDG4 and the fifth drive gear IDG5 selectively connected to the torque mediating shaft TMS by a second synchronizer SN2.

Gear ratios between drive and driven gears of the first, second, third, fourth, fifth, sixth, and seventh gear set GL1, GL2, GL3, GL4, GL5, GL6, and GL7 may be appropriately set in consideration of transmission requirements. The gear ratios of the first gear set GL1 and the second gear set GL2 are used for realizing the forward first speed and the forward seventh speed. The gear ratios of the first gear set GL1 and the third gear set GL3 are used for realizing the forward third speed and the forward fifth speed. The gear ratio of the fourth gear set GL2 is used for realizing the forward second speed and the forward sixth speed. The gear ratios of the fifth gear set GL5 and the sixth gear set GL6 are used for realizing the forward ninth speed and the reverse speed. The gear ratio of the seventh gear set GL7 is used for realizing the forward fourth speed.

The output shaft OS is an output member, and by receiving torques input from the second shifting section TM2, transmits the received torque to a differential DIFF through the output gear OG and the final reduction gear FDG.

In addition, five engagement elements of an engine clutch ECL and first to fourth clutches CL1, CL2, CL3, and CL4 are disposed between rotating members such as various shafts, and one engagement element of a brake B1 is disposed between a rotating member and the transmission housing H.

The engine clutch ECL is arranged between the engine output shaft EOS (e.g., engine crankshaft) and the first input shaft IS1, and selectively interconnects the engine output shaft EOS and the first input shaft IS1.

The first clutch CL1 is arranged between the first input shaft IS1 and the third input shaft IS3, and selectively connects the first input shaft IS1 and the third input shaft IS3.

The second clutch CL2 is arranged between the first input shaft IS1 and the second input shaft IS2, and selectively connects the first input shaft IS1 and the second input shaft IS2.

The third clutch CL3 is arranged between the first input shaft IS1 and the torque mediating shaft TMS, and selectively connects the first input shaft IS1 and the torque mediating shaft TMS.

The fourth clutch CL4 is arranged between the ring gear R and the sun gear S, and selectively connects the ring gear R and the sun gear S.

Therefore, the planetary gear set PG integrally rotates by the operation of the fourth clutch CL4.

The first brake B1 is arranged between the second intermediate shaft CS2 and the transmission housing H, and therefore, the second intermediate shaft CS2 selectively acts as a fixed element.

The engagement elements of the engine clutch ECL, the first to fourth clutches CL1 to CL4, and the first brake B1 may be realized as multi-plate hydraulic pressure friction devices that are frictionally engaged by hydraulic pressure, however, it should not be understood to be limited thereto, since various other configuration that are electrically controllable may be available.

The first and second synchronizers SN1 and SN2 may be formed as a known scheme, and the first and second sleeves SLE1 and SLE2 applied to the first and second synchronizers SN1 and SN2 may be operated by respective actuators (not shown) that may be controlled by a transmission control unit.

Figure 2:
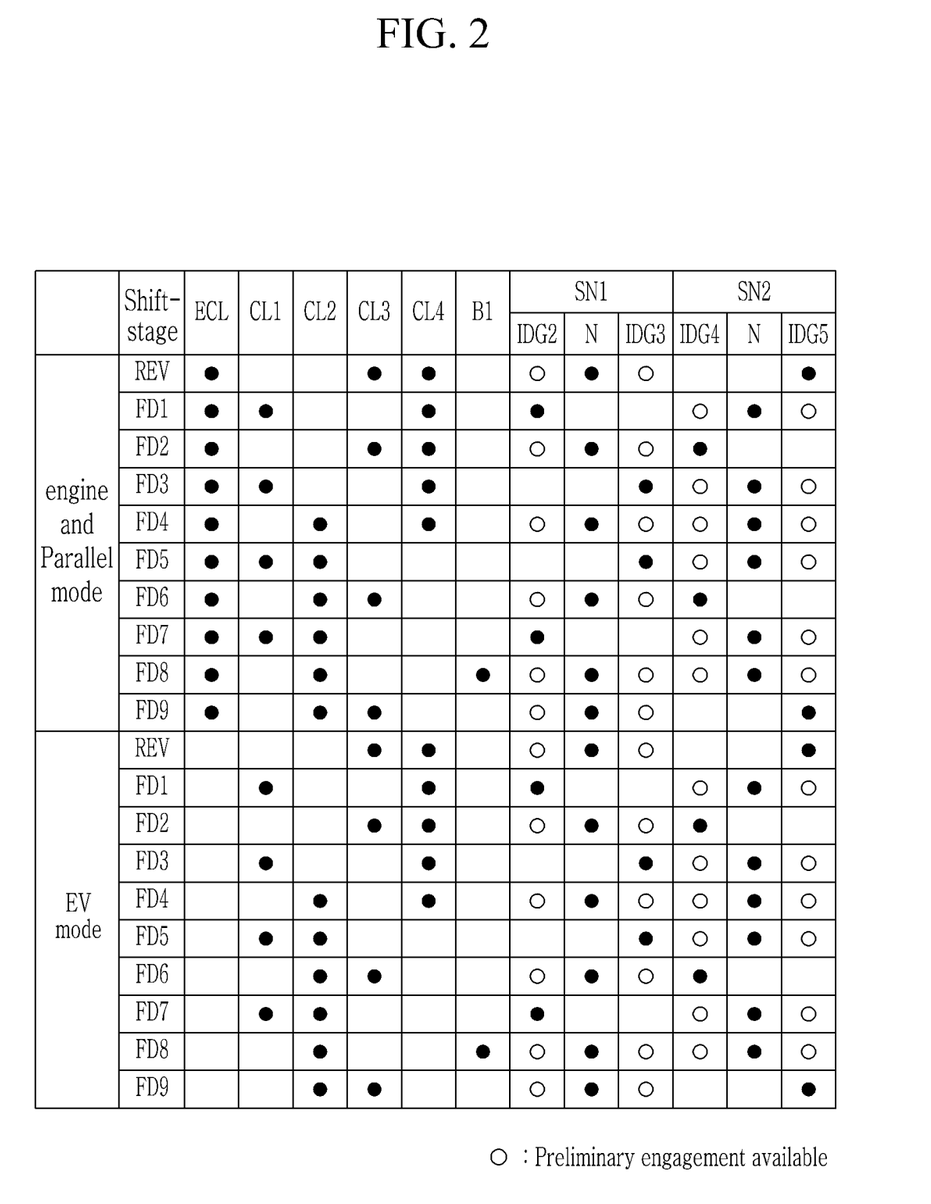
FIG. 2 is a shifting operational chart of a power transmission apparatus for a vehicle.

FIG. 2 is a shifting operational chart for a power transmission apparatus for a vehicle, and the power transmission apparatus for a vehicle which performs shifting operation as follows.

Engine and Parallel Mode Reverse Speed

In the engine and parallel mode reverse speed REV, as shown in FIG. 2, the torque mediating shaft TMS and the fifth drive gear IDG5 are synchronously connected by the operation of the sleeve SLE2 of the second synchronizer SN2, and the engine clutch ECL and the third and fourth clutches CL3 and CL4 are operated.

As a result, by the operation of the third clutch CL3, the torque of the engine ENG is reversely input to the ring gear R of the second shifting section TM2 through the first input shaft IS1, the torque mediating shaft TMS, the second synchronizer SN2, the fifth gear set GL5, the second idle shaft IDS2, and the sixth gear set GL6.

In addition, by the operation of the fourth clutch CL4, the planetary gear set PG of the second shifting section TM2 integrally rotates, and therefore, the torque input to the ring gear R is output as inputted, to the differential DIFF through the output shaft OS, thereby realizing the reverse speed.

The Engine and Parallel Mode Forward First Speed

In the engine and parallel mode forward first speed FD1, as shown in FIG. 2, the first intermediate shaft CS1 and the second drive gear IDG2 are synchronously interconnected by the operation of the sleeve SLE1 of the first synchronizer SN1, and the engine clutch ECL and the first, fourth clutch CL1 and CL4 are operated.

As a result, by the operation of the first clutch CL1, the torque of the engine ENG is input to the ring gear R of the second shifting section TM2 through the third input shaft IS3, the first gear set GL1, the first intermediate shaft CS1, the first synchronizer SN1, and the second gear set GL1.

In addition, by the operation of the fourth clutch CL4, the planetary gear set PG of the second shifting section TM2 integrally rotates, and therefore, the torque input to the ring gear R is output as inputted, to the differential DIFF through the output shaft OS, thereby realizing the forward first speed.

The Engine and Parallel Mode Forward Second Speed

In the engine and parallel mode forward second speed FD2, as shown in FIG. 2, the torque mediating shaft TMS and the fourth drive gear IDG4 are synchronously interconnected by the operation of the sleeve SLE2 of the second synchronizer SN2, and the engine clutch ECL and the third and fourth clutches CL3 and CL4 are operated.

As a result, by the operation of the third clutch CL3, the torque of the engine ENG is input to the ring gear R of the second shifting section TM2 through the first input shaft IS1, the torque mediating shaft TMS, the second synchronizer SN2, and the fourth gear set GL4.

In addition, by the operation of the fourth clutch CL4, the planetary gear set PG of the second shifting section TM2 integrally rotates, and therefore, the torque input to the ring gear R is output as inputted, to the differential DIFF through the output shaft OS, thereby realizing the forward second speed.

The Engine and Parallel Mode Forward Third Speed

In the engine and parallel mode forward third speed FD3, as shown in FIG. 2, the first intermediate shaft CS1 and the third drive gear IDG3 are synchronously interconnected by the operation of the sleeve SLE1 of the first synchronizer SN1, and the engine clutch ECL and the first, fourth clutch CL1 and CL4 are operated.

As a result, by the operation of the first clutch CL1, the torque of the engine ENG is input to the ring gear R of the second shifting section TM2 through the third input shaft IS3, the first gear set GL1, the first intermediate shaft CS1, the first synchronizer SN1, the third gear set GL3, and the second intermediate shaft CS2.

In addition, by the operation of the fourth clutch CL4, the planetary gear set PG of the second shifting section TM2 integrally rotates, and therefore, the torque input to the ring gear R is output as inputted, to the differential DIFF through the output shaft OS, thereby realizing the forward third speed.

The Engine and Parallel Mode Forward Fourth Speed

In the engine and parallel mode forward fourth speed FD4, as shown in FIG. 2, both the first and second synchronizers SN1 and SN2 are maintained neutral, and the engine clutch ECL and the second, fourth clutch CL2 and CL4 are operated.

As a result, by the operation of the second clutch CL2, the torque of the second input shaft IS2 is input to the planet carrier PC of the second shifting section TM2 through the seventh gear set GL7.

In addition, by the operation of the fourth clutch CL4, the planetary gear set PG of the second shifting section TM2 integrally rotates, and therefore, the torque input to the planet carrier PC is output as inputted, to the differential DIFF through the output shaft OS, thereby realizing the forward fourth speed.

That is, shifting in the forward fourth speed is made according to the gear ratio of the seventh gear set GL7.

The Engine and Parallel Mode Forward Fifth Speed

In the engine and parallel mode forward fifth speed FD5, as shown in FIG. 2, the first intermediate shaft CS1 and the third drive gear IDG3 are synchronously interconnected by the operation of the sleeve SLE1 of the first synchronizer SN1, and the engine clutch ECL and the first and second clutches CL1 and CL2 are operated.

As a result, by the operation of the first clutch CL1, the torque of the engine ENG is partially input to the ring gear R of the second shifting section TM2 through the third input shaft IS3, the first gear set GL1, the first intermediate shaft CS1, the first synchronizer SN1, the third gear set GL3, and the second intermediate shaft CS2.

In addition, by the operation of the second clutch CL2, the torque of the engine ENG is partially input to the planet carrier PC of the second shifting section TM2 through the second input shaft IS2 and the seventh gear set GL7.

Then, shifting is performed by cooperative operation of the ring gear R and the planet carrier PC in the second shifting section TM2 according to a rotation speed difference, and a shifted torque is output to the differential DIFF through the output shaft OS, thereby realizing the forward fifth speed.

The Engine and Parallel Mode Forward Sixth Speed

In the engine and parallel mode forward sixth speed FD6, as shown in FIG. 2, the torque mediating shaft TMS and the fourth drive gear IDG4 are synchronously interconnected by the operation of the sleeve SLE2 of the second synchronizer SN2, and the engine clutch ECL and the second and third clutches CL2 and CL3 are operated.

As a result, by the operation of the second clutch CL2, the torque of the engine ENG is partially input to the planet carrier PC of the second shifting section TM2 through the second input shaft IS2 and the seventh gear set GL7.

In addition, by the operation of the third clutch CL3, the torque of the engine ENG is partially input to the ring gear R of the second shifting section TM2 through the first input shaft IS1, the torque mediating shaft TMS, the second synchronizer SN2, and the fourth gear set GL4.

Then, shifting is performed by cooperative operation of the ring gear R and the planet carrier PC in the second shifting section TM2 according to a rotation speed difference, and a shifted torque is output to the differential DIFF through the output shaft OS, thereby realizing the forward sixth speed.

The Engine and Parallel Mode Forward Seventh Speed

In the engine and parallel mode forward seventh speed FD7, as shown in FIG. 2, the first intermediate shaft CS1 and the second drive gear IDG2 are synchronously interconnected by the operation of the sleeve SLE1 of the first synchronizer SN1, and the engine clutch ECL and the first and second clutches CL1 and CL2 are operated.

As a result, by the operation of the first clutch CL1, the torque of the engine ENG is partially input to the ring gear R of the second shifting section TM2 through the third input shaft IS3, the first gear set GL1, the first intermediate shaft CS1, the first synchronizer SN1, and the second gear set GL2.

In addition, by the operation of the second clutch CL2, the torque of the engine ENG is partially input to the planet carrier PC of the second shifting section TM2 through the second input shaft IS2 and the seventh gear set GL7.

Then, shifting is performed by cooperative operation of the ring gear R and the planet carrier PC in the second shifting section TM2 according to a rotation speed difference, and a shifted torque is output to the differential DIFF through the output shaft OS, thereby realizing the forward seventh speed.

The Engine and Parallel Mode Forward Eighth Speed

In the engine and parallel mode forward eighth speed FD8, as shown in FIG. 2, the first and second synchronizers SN1 and SN2 are maintained neutral, and the engine clutch ECL, the second clutch CL2 and the first brake B1 are operated.

As a result, by the operation of the second clutch CL2, the torque of the second input shaft IS2 is input to the planet carrier PC of the second shifting section TM2 through the seventh gear set GL7.

In addition, by the operation of the first brake B1, the ring gear R acts as a fixed element while the planet carrier PC receives an input torque, thereby forming an increased output speed, and a shifted torque is output to the differential DIFF through the output shaft OS, thereby realizing the forward eighth speed.

The Engine and Parallel Mode Forward Ninth Speed

In the engine and parallel mode forward ninth speed FD9, as shown in FIG. 2, the torque mediating shaft TMS and the fifth drive gear IDG5 are synchronously interconnected by the operation of the sleeve SLE2 of the second synchronizer SN2, and the engine clutch ECL and the second and third clutches CL2 and CL3 are operated.

As a result, by the operation of the second clutch CL2, the torque of the second input shaft IS2 is input to the planet carrier PC of the second shifting section TM2 through the seventh gear set GL7.

In addition, by the operation of the third clutch CL3, the torque of the first input shaft IS1 is reversely input to the ring gear R of the second shifting section TM2 through the fifth gear set GL5, the second idle shaft IDS2, and the sixth gear set GL6.

Therefore, the planetary gear set PG outputs a further increased speed than in the forward eighth speed, and a shifted torque is output to the differential DIFF through the output shaft OS, thereby realizing the forward ninth speed.

In the above description of the "engine and parallel mode", only the engine ENG is exampled as a power source. However, it may be obviously understood that such shifting operation may be maintained even if the motor/generator MG is activated to form a parallel mode and assist the engine ENG.

An electric vehicle mode EV mode differs from the engine and parallel mode, only in that the engine ENG is stopped while releasing the engine clutch ECL and only the motor/generator MG is used as sole power source. It may be understood that such a difference will not affect the above-described shifting operation, and thus, in such an electric vehicle mode EV mode the same shift-stages of one reverse speed REV and nine forward speeds of the forward first speed FD1 to the forward ninth speed FD9 may be obtained by the same operational chart.

A power transmission apparatus for a vehicle realizes shift-stages of nine forward speeds and one reverse speed by employing a planetary gear set and two synchronizers to a multiple clutch transmission, thereby enabling multiple shift-stages by a simplified arrangement, improving installability, and reducing an overall weight.

In addition, in one aspect of the present disclosure, a system or vehicle may receive torque from a motor/generator as well as an engine, such that a vehicle may be driving in an electric vehicle mode and parallel hybrid mode, thereby improving fuel consumption.

While the disclosure has been submitted with what is presently considered to be practical aspects, it is to be understood that the disclosure is not limited to the described aspects, but, on the contrary, will cover various modifications and equivalent arrangements included within the spirit and scope of the description.

DESCRIPTION OF SYMBOLS

B1: first brake
CL1, CL2, CL3, CL4: first, second, third, and fourth clutches
CS1, CS2: first and second intermediate shafts
ECL: engine clutch
EOS: engine output shaft (e.g., crankshaft)
GL1, GL2, GL3, GL4, GL5, GL6, GL7: first, second, third, fourth, fifth, sixth, and seventh gear set
IDG1, IDG2, IDG3, IDG4, IDG5, IDG6, IDG7: first, second, third, fourth, fifth, sixth, and seventh drive gears
IPG1, IPG2, IPG3, IPG4, IPG5, IPG6, IPG7: first, second, third, fourth, fifth, sixth, and seventh driven gears
IDS1, IDS2: first and second idle shafts
IDG: idle gear
IS1, IS2, IS3: first, second, and third input shafts
OG: output gear
OS: output shaft
PG: planetary gear set
SN1, SN2: first and second synchronizers
TMS: torque mediating shaft
TM1, TM2: first and second shifting sections

What is claimed is:

1. A power transmission apparatus for a vehicle having an engine and a motor/generator selectively connected to the engine, the power transmission apparatus comprising:
    a first input shaft directly connected with the motor/generator;
    a second input shaft formed as a hollow shaft, disposed coaxial with and external to the first input shaft without rotational interference, and selectively connected with the first input shaft;
    a third input shaft formed as a hollow shaft, disposed coaxial with and external to the second input shaft without rotational interference, and selectively connected with the first input shaft;
    a torque mediating shaft formed as a hollow shaft disposed coaxial with and external to the first input shaft without rotational interference, and selectively connected with the first input shaft;
    a first intermediate shaft disposed in parallel with the first input shaft;
    a second intermediate shaft disposed in parallel with the first input shaft, and selectively connected with a transmission housing;
    first and second idle shafts disposed in parallel with the first input shaft;
    an output shaft disposed in parallel with the first input shaft and coaxially with the second intermediate shaft, and selectively connected with the second intermediate shaft;
    a first shifting section including six gear sets disposed on the first and third input shafts, the first and second intermediate shafts, the first and second idle shafts, and the torque mediating shaft, the first shifting section selectively receiving torque through the first and third input shafts and outputting a plurality of intermediate shift-stages shifted from the received torque; and
    a second shifting section including a planetary gear set having a sun gear fixedly connected with the output shaft, forming an output torque by combination a torque selectively transmitted from the first shifting section through the six gear sets and a torque received from the second input shaft, and outputting the output torque to the output shaft.

2. The power transmission apparatus of claim 1, wherein the first shifting section comprises:
    a first gear set including a first drive gear fixedly connected with the third input shaft, an idle gear fixedly connected with the first idle shaft and externally gear-meshed with the first drive gear, and a first driven gear fixedly connected with the first intermediate shaft and externally gear-meshed with the idle gear;
    a second gear set including a second drive gear disposed coaxial with and external to the first intermediate shaft without rotational interference, and a second driven gear fixedly connected with a ring gear of the planetary gear set and externally gear-meshed with the second drive gear;
    a third gear set including a third drive gear disposed coaxial with and external to the first intermediate shaft without rotational interference, and a third driven gear fixedly connected with the second intermediate shaft and externally gear-meshed with the third drive gear;
    a fourth gear set including a fourth drive gear disposed coaxial with and external to the torque mediating shaft without rotational interference, and the second driven gear externally gear-meshed with the fourth drive gear;
    a fifth gear set including a fifth drive gear disposed coaxial with and external to the torque mediating shaft without rotational interference, and a fifth driven gear fixedly connected with the second idle shaft and externally gear-meshed with the fifth drive gear; and
    a sixth gear set including a sixth drive gear fixedly connected with the second idle shaft, and the second driven gear externally gear-meshed with the sixth drive gear.

3. The power transmission apparatus of claim 2, wherein:
    the second drive gear and the third drive gear are selectively connected with the first intermediate shaft through a first synchronizer; and
    the fourth drive gear and the fifth drive gear are selectively connected with the torque mediating shaft through a second synchronizer.

4. The power transmission apparatus of claim 2, wherein, in the first shifting section:
    gear ratios of the first gear set and the second gear set are used for realizing a forward first speed and a forward seventh speed;

gear ratios of the first gear set and the third gear set are used for realizing a forward third speed and a forward fifth speed;

a gear ratio of the fourth gear set is used for realizing a forward second speed and a forward sixth speed;

gear ratios of the fifth gear set and the sixth gear set are used for realizing a forward ninth speed and a reverse speed; and a gear ratio of a seventh gear set is used for realizing a forward fourth speed.

5. The power transmission apparatus of claim 1, wherein, in the second shifting section:

a ring gear of the planetary gear set receives a torque from the first shifting section;

a planet carrier of the planetary gear set receives a torque from the second input shaft through a seventh gear set; and the sun gear is fixedly connected with the output shaft and selectively connected with the ring gear.

6. The power transmission apparatus of claim 5, wherein the seventh gear set comprises a seventh drive gear fixedly connected with the second input shaft, and a seventh driven gear fixedly connected with the planet carrier of the planetary gear set and externally gear-meshed with the seventh drive gear.

7. The power transmission apparatus of claim 5, wherein the planetary gear set is a single pinion planetary gear set.

8. The power transmission apparatus of claim 1, further comprising:

five clutches each selectively connecting a corresponding pair among the shafts; and a brake selectively connecting a corresponding shaft to the transmission housing.

9. The power transmission apparatus of claim 8, wherein the five clutches comprise:

an engine clutch arranged between the engine and the first input shaft;

a first clutch arranged between the first input shaft and the third input shaft;

a second clutch arranged between the first input shaft and the second input shaft;

a third clutch arranged between the first input shaft and the torque mediating shaft; and a fourth clutch disposed between a ring gear and sun gear of the planetary gear set, wherein the brake is arranged between the second intermediate shaft and the transmission housing.

* * * * *